United States Patent
Molins Borrell et al.

(10) Patent No.: US 10,900,467 B2
(45) Date of Patent: Jan. 26, 2021

(54) FLOATING STRUCTURE FOR SUPPORTING A MARINE WIND TURBINE

(71) Applicant: UNIVERSITAT POLITECNICA DE CATALUNYA, Barcelona (ES)

(72) Inventors: Climent Molins Borrell, Barcelona (ES); Alexis Campos Hortigüela, Barcelona (ES)

(*) Notice: Subject to any disclaimer, the term of this patent is extended or adjusted under 35 U.S.C. 154(b) by 0 days.

(21) Appl. No.: 16/410,540

(22) Filed: May 13, 2019

(65) Prior Publication Data

US 2019/0264656 A1 Aug. 29, 2019

Related U.S. Application Data

(63) Continuation-in-part of application No. 15/531,372, filed as application No. PCT/ES2015/070789 on Nov. 4, 2015, now abandoned.

(30) Foreign Application Priority Data

Nov. 27, 2014 (ES) .................................. 201431765

(51) Int. Cl.
*F03D 13/25* (2016.01)
*B63B 35/44* (2006.01)

(52) U.S. Cl.
CPC .............. *F03D 13/25* (2016.05); *B63B 35/44* (2013.01); *B63B 2035/446* (2013.01); *B63B 2241/06* (2013.01); *B63B 2241/10* (2013.01); *F05B 2240/93* (2013.01); *F05B 2240/95* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,555,600 | B2 * | 10/2013 | Cortina-Cordero | E04H 12/16 52/745.18 |
| 2013/0224020 | A1 * | 8/2013 | Dagher | B63B 5/14 416/84 |
| 2013/0272846 | A1 * | 10/2013 | Inoue | F03B 17/06 415/3.1 |
| 2014/0033628 | A1 * | 2/2014 | Lockwood | E04H 12/16 52/223.5 |
| 2014/0079548 | A1 * | 3/2014 | Rodriguez Tsouroukdissian | F03D 80/00 416/85 |

FOREIGN PATENT DOCUMENTS

GB 2419150 * 4/2006

* cited by examiner

*Primary Examiner* — Sean D Andrish
(74) *Attorney, Agent, or Firm* — Eugenio J. Torres-Oyola; Victor M. Rodriguez-Reyes; Rafael Rodriguez-Muriel

(57) ABSTRACT

A floating structure for supporting a marine wind turbine comprising an emerged tower (21) defined by a tower wall (31), a submerged float (23) defined by a float wall (33) and a float lower end closing wall (34) and a transition element (22) placed in-between and defined by a transition wall (32), wherein the tower wall (31), the float wall (33) and the transition wall (32) have axisymmetric outer surfaces about a central axis (5) respectively defined by a tower generatrix, a float generatrix and a curved concave transition generatrix which is tangent to the tower generatrix, and wherein the axisymmetric outer surface of the float wall (33) has a float upper diameter (D2) equal to the axisymmetric outer surface of the transition wall (32) and bigger than the axisymmetric outer surface of the tower wall (31).

10 Claims, 4 Drawing Sheets

FLOATING STRUCTURE FOR SUPPORTING A MARINE WIND TURBINE

CROSS-REFERENCE

This application is a continuation in part application of the U.S. patent application Ser. No. 15/531,372 which in turn is the entry into national phase of Application No. PCTIES2015/070789 filed on Nov. 4, 2015 which claims the benefit of Spanish Application No. P201431765 filed on Nov. 27, 2014.

TECHNICAL FIELD

The present invention relates to a floating structure for supporting a marine wind turbine, with the floating structure comprising a tower, a float, and a transition element between the tower and the float, wherein the transition element and the float are made of reinforced concrete forming together concrete monolithic body and wherein the tower can be made of metal and connected to the concrete monolithic body or can be made of reinforced concrete and form part of the concrete monolithic body.

BACKGROUND OF THE INVENTION

Ever since the implementation of the earliest offshore wind farms, industry has leaned more towards the use of concrete elements for supporting the towers that hold up the wind turbines as a result of the best performance of the concrete material in the marine environment.

The transition between steel parts and concrete parts in these structures has a critical zone in connection with the durability of the structure, primarily due to fatigue in the concrete in the area where the steel parts and concrete parts are joined together.

Therefore, there is a need for minimizing the concentrations of strains along the transition zone between steel parts and concrete parts, assuring a maximum service life both in terms of durability and fatigue, by providing a continuous joint-free part connecting the tower with the sub-structure.

Document WO2013/093160A1 discloses a one-piece floating monolithic reinforced and pre-stressed concrete structure, including a tower and a float.

In the design of floating structures, the geometry of a section thereof intersecting with mean sea level is a key factor for the correct hydrodynamic behavior of the structure, such that the diameter in this section is usually the least which is capable of withstanding design strains.

In contrast, the design of the float is usually focused on maximizing stability of the structure with the lowest possible depth, involving larger diameters in the float than in the tower. This difference between diameters involves great concentrations of stresses in the lower end of the tower and in the upper end of float, particularly in the case of transitions having a small length, or even transitions having nil length, wherein a key factor is the ratio between the diameters of the lower end of the tower and the upper end of the float.

In the case of monolithic concrete structures, wherein the tower and the float form a single monolithic concrete body and the prestressing strains of the concrete generate considerable deflection strains in the changes of geometry, the fact of achieving a geometry which allows uniformly distributing stresses over the structure allows increasing durability of the structure as well as reducing the cost of making floating monolithic concrete structures.

In those cases comprising a tower made of metal and a float made of reinforced concrete, in which the steel-concrete joint must be kept as far away as possible from the surface of the water for the sake of durability and tightness, there is a need for performing the transition between metal and concrete where the float connects with the tower up to just a few meters above mean sea level in order to minimize durability and maintenance issues of the zone that is most exposed to the most aggressive environmental vectors.

DISCLOSURE OF THE INVENTION

The present invention proposes a floating structure for supporting a marine wind turbine wherein the floating structure comprises a transition geometry between a float and a wind turbine tower that allows transmitting strains generated at the base of the tower to the float, which has a greater diameter than the tower, without the need for stiffeners or other external elements on the actual tubular wall of the concrete structure, which would increase weight and, therefore, cause a loss of buoyancy.

More specifically, the present invention provides a floating structure for supporting a marine wind turbine, in which the floating structure comprises a tower, a float, and a transition element between the tower and the float.

The tower has a tower frustoconical lower portion adjacent to the transition element and said tower frustoconical lower portion has a tower wall having a tower axisymmetric outer surface about a central axis. The tower axisymmetric outer surface has a tower lower diameter and is defined by a tower generatrix.

The float has a float wall and a float lower end closing wall. The float wall has a float axisymmetric outer surface about the central axis. The float axisymmetric outer surface has a float upper diameter and is defined by a float generatrix, wherein the float upper diameter is greater than the tower lower diameter.

The transition element has a transition wall which has a transition axisymmetric outer surface about the central axis. Said transition axisymmetric outer surface has a transition upper diameter equal to the tower lower diameter and a transition lower diameter equal to the float upper diameter and is defined by a curved concave transition generatrix. The curved concave transition generatrix is tangent to the tower generatrix.

The float wall, the float lower end closing wall and the transition wall are made of reinforced concrete forming together a reinforced concrete monolithic body. Preferably, the float wall has a float upper end wall thickness and the transition wall has a transition upper end wall thickness and a transition lower end wall thickness, wherein the transition lower end wall thickness is equal to the float upper end wall thickness.

In an embodiment, the curved concave transition generatrix is and arch of circumference.

In another embodiment, the curved concave transition generatrix is adjusted by means of two or more straight segments providing two or more frustoconical segments in the transition wall.

In an embodiment, the tower or at least the tower frustoconical lower portion is made of metal and is connected to the concrete monolithic body by bolts.

In this case, the reinforced concrete monolithic body has continuous longitudinal reinforcement tendons arranged along the transition wall and the float wall, circumferential reinforcement tendons distributed along the transition wall and the float wall, and a set of main circumferential reinforcement tendons clustered in a geometrical discontinuity zone comprising a meeting point of the transition wall and the float wall.

Preferably, the main circumferential reinforcement tendons, the circumferential reinforcement tendons and the longitudinal reinforcement tendons are pre-stressed steel tendons arranged inside sleeves embedded in the concrete monolithic body.

In another embodiment, the tower wall is made of reinforced concrete and forms part of the reinforced concrete monolithic body together with the float wall, the float lower end closing wall and the transition wall.

In this case, the reinforced concrete monolithic body has continuous longitudinal reinforcement tendons arranged along the tower wall, the transition wall and the float wall, and circumferential reinforcement tendons distributed along the tower wall, the transition wall and the float wall, and a set of main circumferential reinforcement tendons clustered in a geometrical discontinuity zone comprising a meeting point of the transition wall and the float wall.

Preferably, the main circumferential reinforcement tendons, the circumferential reinforcement tendons and the longitudinal reinforcement tendons are pre-stressed steel tendons arranged inside sleeves embedded in the concrete monolithic body.

In any case, the curved concave transition generatrix is optionally an arch of circumference.

BRIEF DESCRIPTION OF THE DRAWINGS

The invention will be more fully understood from the following detailed description of several preferred embodiments with reference to the accompanying drawings, in which.

DETAILED DESCRIPTION OF PREFERRED EMBODIMENTS

Figure 1:
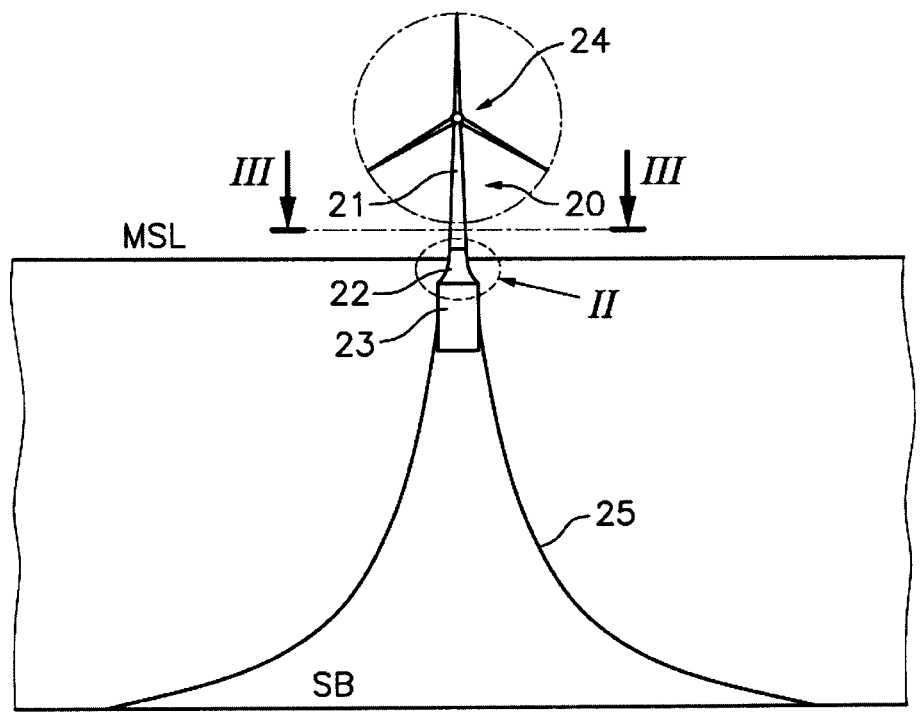
FIG. 1 is a diagrammatic elevation view of a floating structure according to an embodiment of the present invention in a working situation supporting a marine wind turbine.
Figure 2:
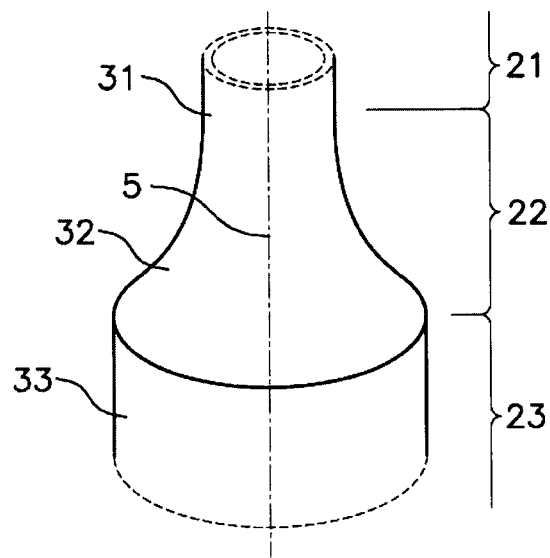
FIG. 2 is an enlarged perspective view of detail II of FIG. 1.
Figure 3:
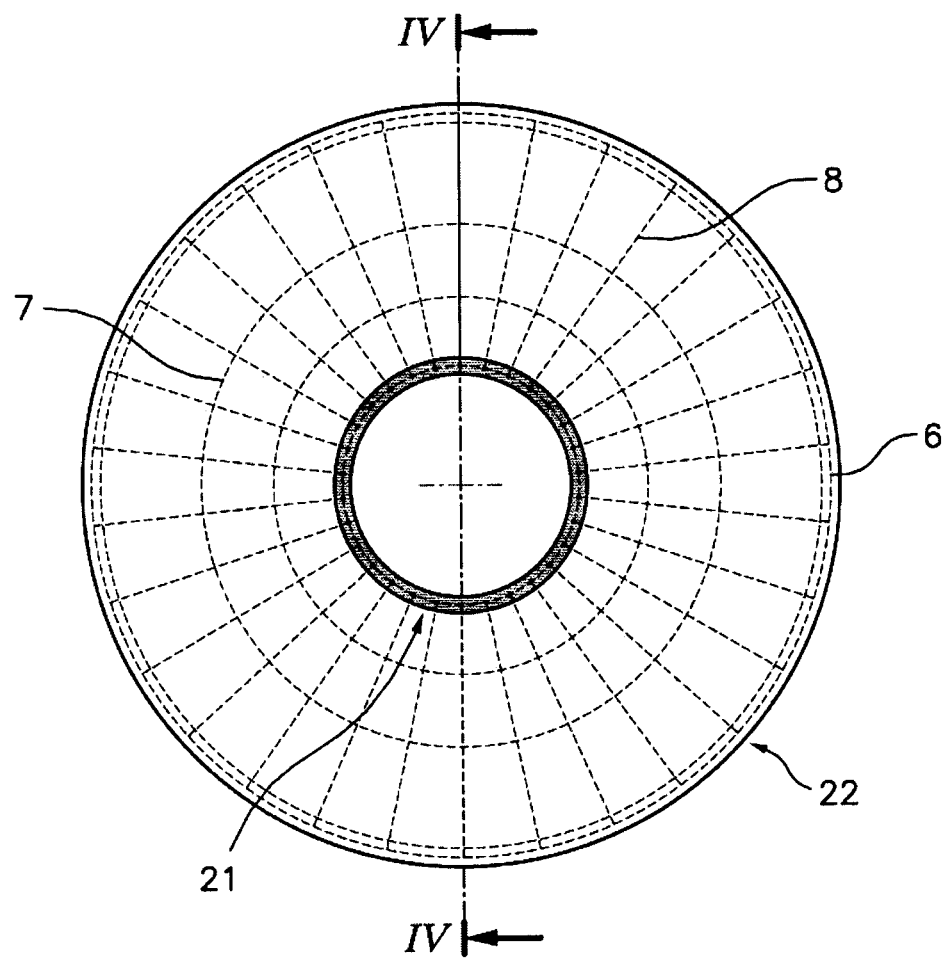
FIG. 3 is a cross-sectional view taken by the plane III-III of FIG. 1.
Figure 4:
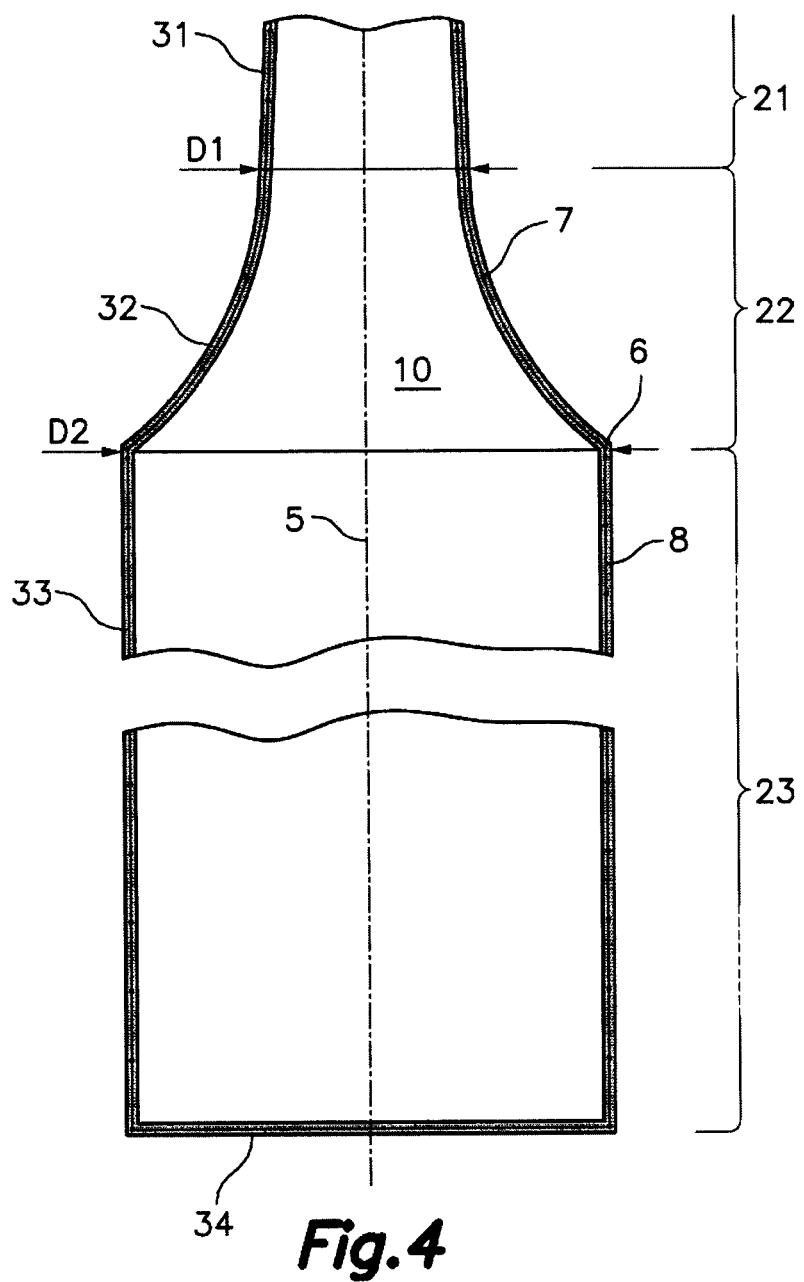
FIG. 4 is a partial cross-sectional view taken by the plane IV-IV of FIG. 3.

Referring first to FIGS. 1-4, the reference character 20 generally indicates a floating structure for supporting marine wind turbines according to an embodiment of the present invention. The floating structure 20 comprises a tower 21, a float 23 and a transition element 22 between the tower 21 and the float 23. In a working situation as depicted in FIG. 1, a marine wind turbine 24 is supported on top of the tower 21 and the floating structure 20 is moored to the seabed SB by mooring lines 25. The floating structure is configured such that, in the working situation, the float 23 is fully submerged in the sea, the transition element 22 is partially submerged in the sea and partially emerged, and the tower is fully emerged. The mean sea level is indicated with the reference characters MSL in FIG. 1.

The floating structure 20 is hollow and has an outer revolution shape about a central axis 5. The tower 21, or at least a lower portion thereof adjacent to the transition element 22, has a frustoconical shape constituting a tower frustoconical lower portion which has a tower wall 31. The tower wall 31 has a tower axisymmetric outer surface about a central axis 5. The float 23 has a float wall 33 and a float lower end closing wall 34. The float wall 33 has a float axisymmetric outer surface about the central axis 5. The transition element 22 has a transition wall 32 which has a transition axisymmetric outer surface about the central axis 5.

The frustoconical tower axisymmetric outer surface of the lower portion of the tower 31 has a tower lower diameter D1. The float axisymmetric outer surface of the float 23 is preferably cylindrical and has a float upper diameter D2. The float upper diameter D2 is greater than the tower lower diameter D1 and the transition axisymmetric outer surface of the transition element 22 has a transition upper diameter equal to the tower lower diameter D1 and a transition lower diameter equal to the float upper diameter D2.

The frustoconical tower axisymmetric outer surface of the lower portion of the tower 31 is defined by a tower generatrix, the float axisymmetric outer surface of the float 23 is defined by a float generatrix, and the transition axisymmetric outer surface of the transition element 22 is defined by a curved concave transition generatrix which is tangent to the tower generatrix. For example, the curved concave transition generatrix is an arch of circumference providing a toroid-shaped transition axisymmetric outer surface. Since the curved concave transition generatrix is not tangent to the float generatrix, there is a geometrical discontinuity zone comprising a meeting point of the transition wall 32 and the float wall 33.

In the embodiment shown in FIGS. 1-4, the tower wall 31, the transition wall 32, the float wall 33 and the float lower end closing wall 34 are made of reinforced concrete forming together a reinforced concrete monolithic body. The tower wall 31 has a tower lower end wall thickness, the float wall 33 has an float upper end wall thickness, and the transition wall 32 has a transition upper end wall thickness equal to the tower lower end wall thickness and a transition lower end wall thickness equal to the float upper end wall thickness.

The reinforced concrete monolithic body has continuous longitudinal reinforcement tendons 8 arranged along the tower wall 31, the transition wall 32 and the float wall 33, and circumferential reinforcement tendons 7 distributed along the tower wall 31, the transition wall 32 and the float wall 33. The reinforced concrete monolithic body further comprises and a set of main circumferential reinforcement tendons 6 clustered in the geometrical discontinuity zone comprising the meeting point of the transition wall 32 and the float wall 33. Preferably, the main circumferential reinforcement tendons 6, the circumferential reinforcement tendons 7 and the longitudinal reinforcement tendons 8 are pre-stressed steel tendons arranged inside sleeves embedded in the concrete monolithic body.

Figure 5:
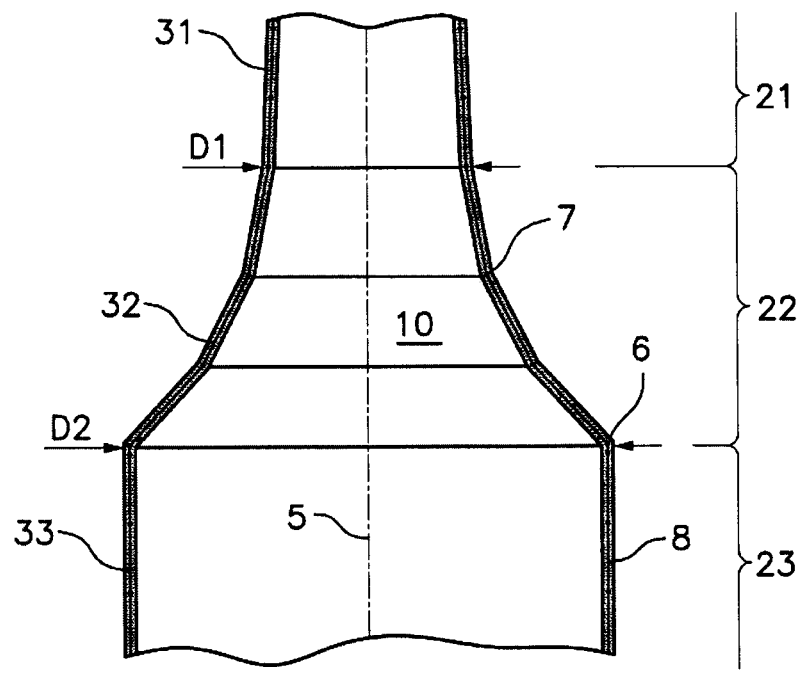
FIG. 5 is a partial cross-sectional view similar to FIG. 4 but belonging to an alternative embodiment of the present invention.

FIG. 5 shows an alternative embodiment similar to that described above with reference to FIGS. 1-4 with the difference that in the embodiment of FIG. 5 the curved concave transition generatrix is adjusted by means of two or more straight segments providing two or more frustoconical segments in the transition wall 32. This option involves higher concentrations of stresses in the junctions of the frustoconical segments which can in turn be absorbed by means of clustered circumferential reinforcement tendons in each junction.

Figure 6:
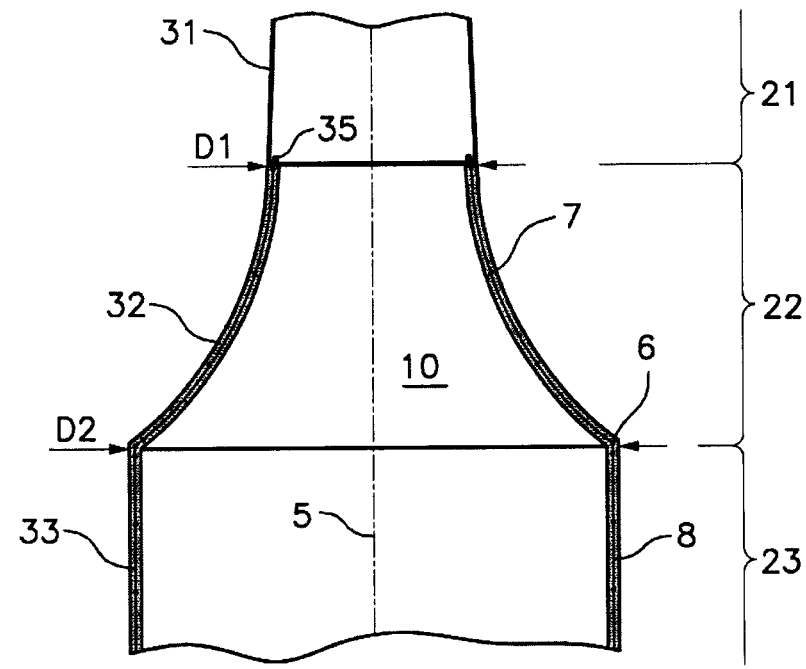
FIG. 6 is a partial cross-sectional view similar to FIG. 4 but belonging to still another alternative embodiment of the present invention.

FIG. 6 shows still another alternative embodiment in which only the transition tubular wall 32 of the transition element 21 and the float wall 33 and the float lower end closing wall 34 of the float 23 are made of reinforced concrete forming together a reinforced concrete monolithic body while the tower wall 31 of the tower frustoconical lower portion of the tower 21 is made of metal and is connected to the concrete monolithic body by bolts 35.

In this embodiment of FIG. 6, the reinforced concrete monolithic body has continuous longitudinal reinforcement tendons 8 arranged along the transition wall 32 and the float wall 33, circumferential reinforcement tendons 7 distributed along the transition wall 32 and the float wall 33, and a set of main circumferential reinforcement tendons 6 clustered in a geometrical discontinuity zone comprising a meeting point of the transition wall 32 and the float wall 33. The main circumferential reinforcement tendons 6, the circumferential reinforcement tendons 7 and the longitudinal reinforcement tendons 8 are preferably pre-stressed steel tendons arranged inside sleeves embedded in the concrete monolithic body.

By means of using the described geometry for the transition element 22 and the float 23 and steel reinforcement tendons 6, 7, 8 for longitudinal and circumferential pre-stressing, a smooth transmission of the strains generated in the tower 21 to the float 23 is achieved through the transition element 22. By adopting this geometry, suitable distribution of the longitudinal and transverse stresses on the concrete is obtained, including the loads of the tower plus those loads due to the prestressing of the reinforcement tendons embedded in the concrete, whether they are longitudinal or circumferential. The state of compression provided by the main circumferential reinforcement tendons 6, the circumferential reinforcement tendons 7 and the longitudinal reinforcement tendons 8 assures durability of the floating structure throughout the entire underwater section thereof and splash zone.

In the case where the walls of the tower 21, the transition element 22 and the float 23 form together a concrete monolithic body, the longitudinal reinforcement tendons 8 correspond to the prestressing longitudinal tendons existing at the lower end of the tower 21, which have continuity to the float 23 through the transition element 22. In the case where the tower is made of metal, the longitudinal reinforcement tendons 8 start from the upper end of the concrete monolithic body adjacent to the lower end of the tower 21, which in the working situation is above the mean sea level MSL.

In addition to the structural advantages, it must be observed that the transition element 22 increases downwardly in diameter in a nonlinear manner such that it allows moving larger diameters away from the surface of the sea, where the effect of the waves is maximal, and decrease exponentially with depth, while they proportionally increase with diameter. This greatly improves the hydrodynamic response of the floating structure, being more permeable on the surface of the sea.

The shape of the transition element 22 also helps to prevent possible adverse effects in movement under severe wave conditions, where a significant part of the transition element 22 is temporarily exposed, which with the use of typical linear transition sections causes significant variations in hydrostatic rigidity, which must be compensated for in the design by means of an increase in the length of the transition section, or in the depth and/or the diameter of the float.

Furthermore, the smooth shape transition at the junction of the tower 21 and the transition element 22 allows for providing a greater radius around the tower with a minimal depth than by means of other types transition shapes, which favors the passage of ships.

What is claimed is:

1. A floating structure for supporting a marine wind turbine, the floating structure comprising a tower, a float moored to a seabed by mooring lines, and a transition element between the tower and the float, wherein:
   the tower has a tower frustoconical lower portion adjacent to the transition element, said tower frustoconical lower portion of the tower having a tower wall having a tower axisymmetric outer surface defined by a tower generatrix about a central axis and a tower lower diameter;
   the float has a float wall and a float lower end closing wall, said float wall has a float axisymmetric outer surface defined by a float generatrix about the central axis and a float upper diameter which is greater than the tower lower diameter;
   the transition element is a transition wall having a transition axisymmetric outer surface defined by a curved concave transition generatrix about the central axis and a transition upper diameter equal to the tower lower diameter and a transition lower diameter equal to the float upper diameter;
   wherein said curved concave transition generatrix is tangent to the tower generatrix;
   at least the float wall, the float lower end closing wall and the transition wall are made of reinforced concrete forming together a reinforced concrete monolithic body;
   wherein the float is fully submerged below a mean sea level, the transition wall is partially submerged and partially emerged from the mean sea level, and the tower is fully emerged from the mean sea level; and
   wherein said curved concave transition generatrix is adjusted by means of two or more straight segments providing two or more frustoconical segments in the transition wall.

2. The floating structure according to claim 1, wherein said curved concave transition generatrix is an arch of circumference.

3. The floating structure according to claim 1, wherein said reinforced concrete monolithic body has continuous longitudinal reinforcement tendons arranged along the transition wall and the float wall, circumferential reinforcement tendons distributed along the transition wall and the float wall, and a set of main circumferential reinforcement tendons clustered in a geometrical discontinuity zone comprising a meeting point of the transition wall and the float wall.

4. The floating structure according to claim 3, wherein the main circumferential reinforcement tendons, the circumferential reinforcement tendons and the longitudinal reinforcement tendons are pre-stressed steel tendons arranged inside sleeves embedded in the concrete monolithic body.

5. The floating structure according to claim 1, wherein the float wall has a float upper end wall thickness and the transition wall has a transition upper end wall thickness and a transition lower end wall thickness, said transition lower end wall thickness being equal to the float upper end wall thickness.

6. The floating structure according to claim 1, wherein the tower wall is made of reinforced concrete and forms part of the reinforced concrete monolithic body together with the float wall, the float lower end closing wall and the transition wall.

7. The floating structure according to claim 5, wherein said reinforced concrete monolithic body has continuous longitudinal reinforcement tendons arranged along the tower wall, the transition wall and the float wall, circumferential reinforcement tendons distributed along the tower wall, the transition wall and the float wall, and a set of main circumferential reinforcement tendons clustered in a geometrical discontinuity zone comprising a meeting point of the transition wall and the float wall.

8. The floating structure according to claim 7, wherein the main circumferential reinforcement tendons, the circumferential reinforcement tendons and the longitudinal reinforcement tendons are pre-stressed steel tendons arranged inside sleeves embedded in the concrete monolithic body.

9. The floating structure according to claim 5, wherein the tower wall tubular has a tower lower end wall thickness, the float wall has a float upper end wall thickness and the transition wall has a transition upper end wall thickness equal to the tower lower end wall thickness and a transition lower end wall thickness equal to the float upper end wall thickness.

10. The floating structure according to claim 1, wherein at least the tower frustoconical lower portion of the tower is made of metal and is connected to the concrete monolithic body by bolts.

\* \* \* \* \*